US005503040A

United States Patent [19]
Wright

[11] Patent Number: 5,503,040
[45] Date of Patent: Apr. 2, 1996

[54] COMPUTER INTERFACE DEVICE

[75] Inventor: Forrest S. Wright, Rochester, Mich.

[73] Assignee: Binagraphics, Inc., Rochester, Mich.

[21] Appl. No.: 151,348

[22] Filed: Nov. 12, 1993

[51] Int. Cl.[6] .................................................. G05G 9/047
[52] U.S. Cl. .................... 74/471 XY; 244/236; 244/237;
341/20; 345/157
[58] Field of Search ...................... 74/471 XY; 244/234,
244/236, 237; 434/45; 273/438, 148 B;
338/334, 128, 130, 131; 345/157, 158,
161; 341/20, 22

[56] References Cited

U.S. PATENT DOCUMENTS

| 4,381,502 | 4/1983 | Prame | 340/365 R |
|---|---|---|---|
| 4,442,506 | 4/1984 | Endfield | 342/22 X |
| 4,574,651 | 3/1986 | Nordstrom | 74/471 XY |
| 4,831,218 | 5/1989 | Wright | 200/5 A |
| 4,895,039 | 1/1990 | Hegg | 74/471 XY |
| 4,951,521 | 8/1990 | Jacobson | 74/479 |
| 4,962,448 | 10/1990 | DeMaio et al. | 364/146 X |
| 5,116,180 | 3/1992 | Fung et al. | 414/50 X |
| 5,142,931 | 9/1992 | Menohem | 74/471 XY |

OTHER PUBLICATIONS

Digital Image Design, Inc. Advertisement excerpted from "Virtual Reality News", vol. 2, Issue 4, p. 21; Sep./Oct. 1993.
Pp. 124–141 excerpted from Pimental & Teixeira, *Virtual Reality*, Windcrest/McGraw-Hill, Inc. (1993).
NASA, Jet Propulsion Laboratory, "Handcontrollers for Teleoperation" JPL Publication 85–11, California Institute of Technology, Pasadena, CA, Mar. 1, 1985, pp. 33–35.

Primary Examiner—Charles A. Marmor
Assistant Examiner—Troy Grabow
Attorney, Agent, or Firm—Dykema Gossett

[57] ABSTRACT

A computer interface device includes a gimbal mounted handle having a plurality of input members for effectively communicating navigation and command signals to a computer. This invention provides a user with six degrees of freedom for navigation within a virtual reality world while simultaneously enabling a user to enter a series of commands in order to effectively communicate a user's intentions to a computer to effect a change within a virtual reality world.

11 Claims, 6 Drawing Sheets

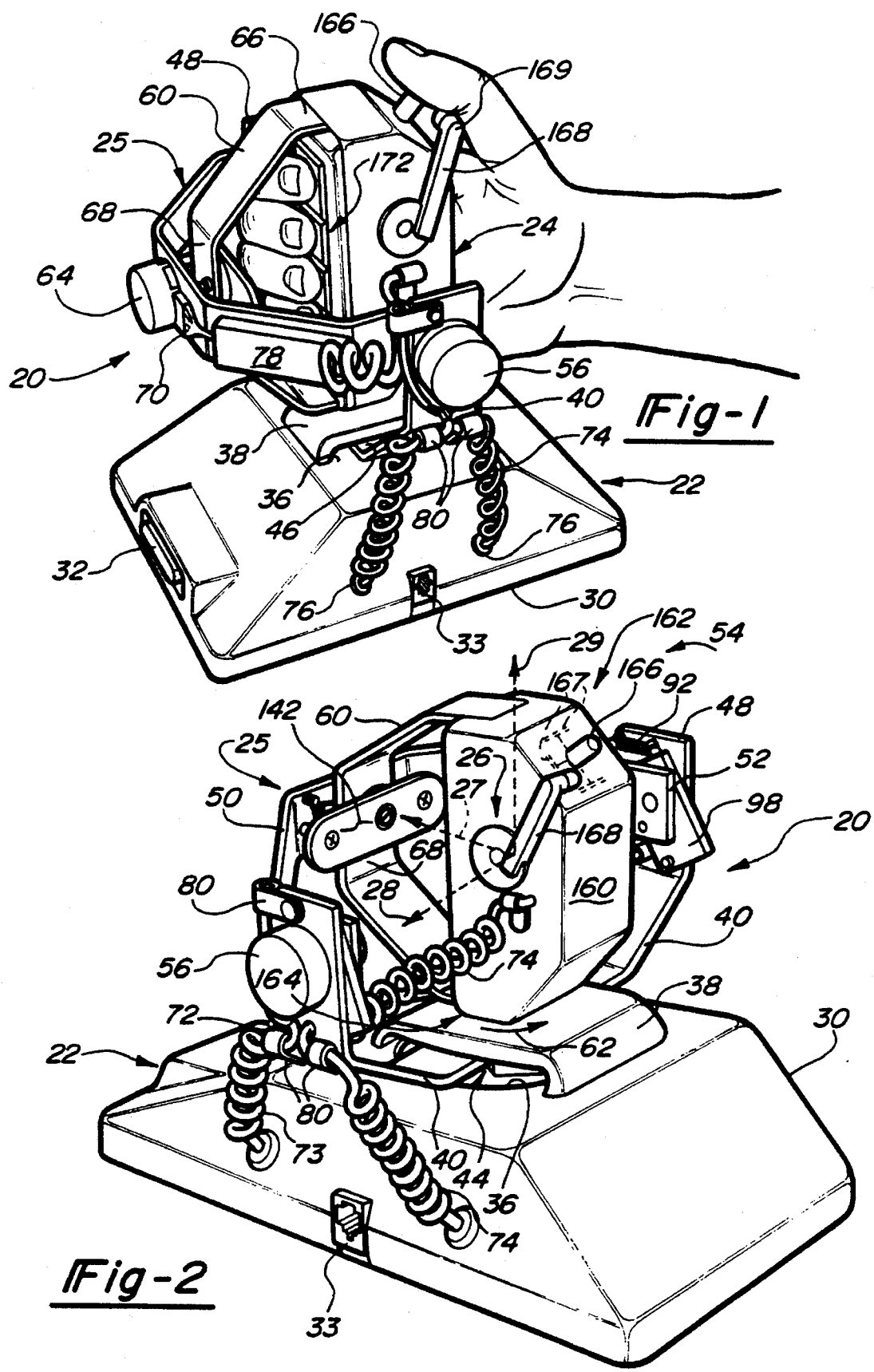

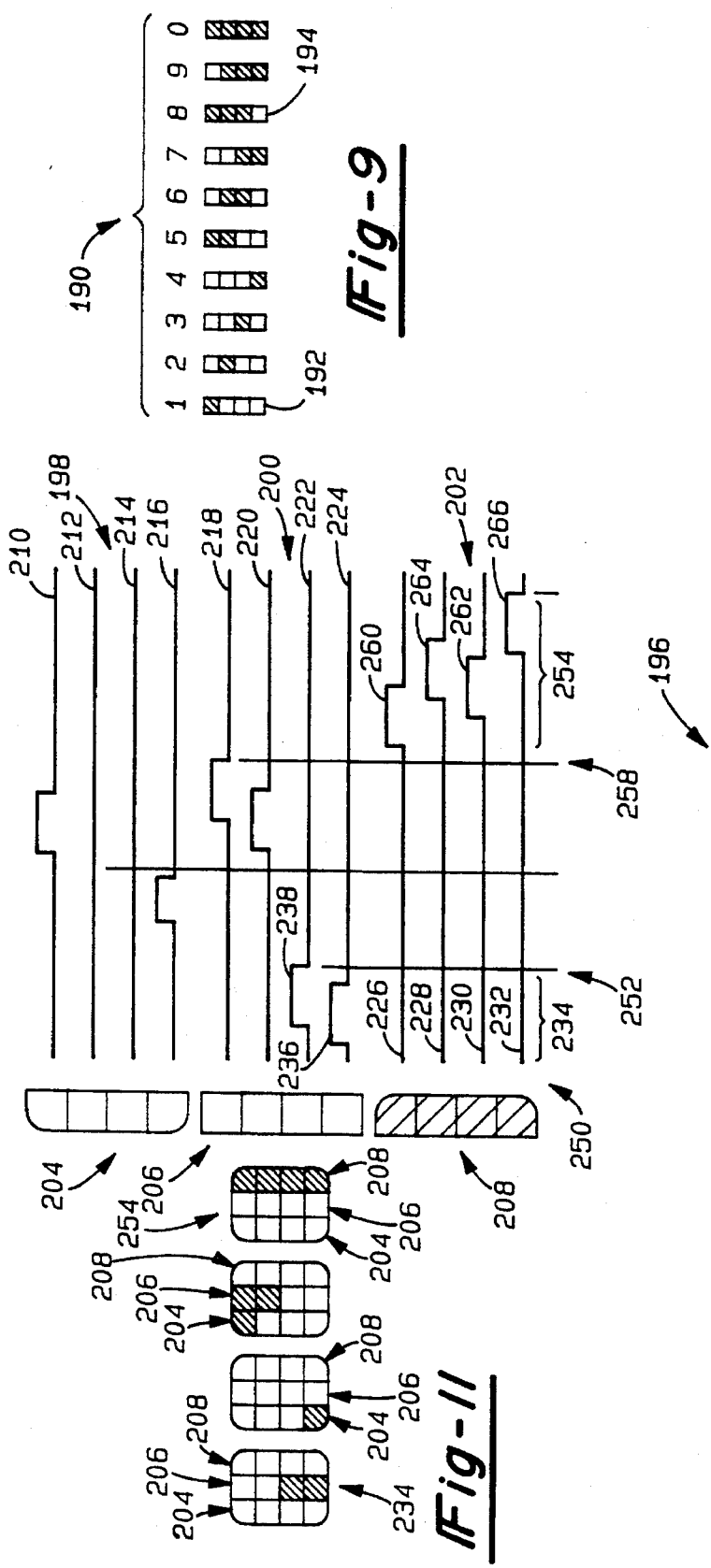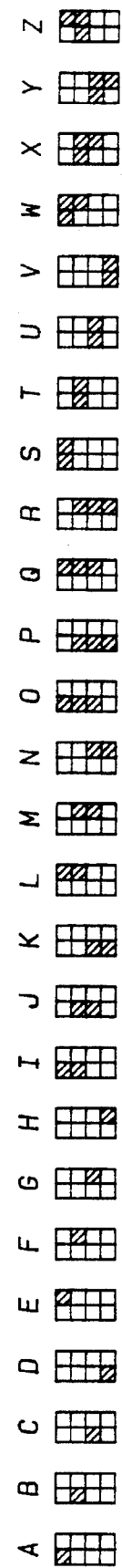
Fig-9
Fig-11
Fig-10

COMPUTER INTERFACE DEVICE

BACKGROUND OF THE INVENTION

1. Field of the Invention

This invention generally relates to a device for interfacing between a user and a computer and more specifically relates to a device for communicating a user's intentions to a computer that responds to the user's intentions by causing changes in the user's environment within a virtual reality realm.

2. Description of the Prior Art

Virtual Reality is a three-dimensional computer generated world wherein a human being can interact through appropriate interfacing tools. Various attempts have been made to design a computer interface tool or interaction device to provide a user with the ability to function within a virtual reality world to at least the same extent that a person is able to function within the true environment.

For simplicity, virtual reality will be described herein in terms of a three dimensional computer display which is presented to a user to define the virtual reality world. The user's interaction with the computer display, or virtual reality world, will be on a level of computer-to-human interface based upon an input from the user which is dictated by motor or neuro-muscular activity on the part of the user. The computer response which dictates the change within the virtual reality world will be considered a visual output which is interpreted through the visual perception of the user. In other words, the virtual reality system or computer receives input from the user through the use of an interface tool, processes information based upon that input and then provides output through a visual display system that is congruent with an effective change within the virtual reality world based upon the input received from the user. The user then processes the visual information and interacts with the virtual reality system by transferring the user's thoughts to the computer to communicate a desired response to or tasks to be completed within the virtual reality world. In order to transfer such thoughts or desires to the computer, the thought information from the brain of the user must be converted to some physical action or a set of signals that the computer is capable of receiving, interpreting and responding to. The ability to transfer the information from the user's thoughts or desires, through movement of the user's musculoskeletal system, to the computer depends on the capabilities of the human-to-virtual reality system interface tools.

Virtual Reality interaction or interface tools that are currently available include several drawbacks and shortcomings. First, in order to provide the various degrees of freedom for movement within a virtual reality world, an interaction tool is typically cumbersome including, for example a large computer input keypad for directing the computer to provide images within the virtual reality world that correspond to the user's intentions. Devices that include cumbersome hardware introduce a time delay between a user's formulation of desired intentions for action within the virtual reality world and communicating those intentions to the computer such that a computer can respond by changing the virtual environment according to the user's intentions. Further limitations include the necessity for a user to learn a complicated or long set of operation commands in order to effectively communicate with the computer on a desirable level.

Second, relatively simpler interface tools provide the ability to operate within a virtual reality realm without relying on complex hardware but also include the limitation of having a limited degree of freedom of movement, for example. One example of such a simple tool might include a conventional "joy stick" like those used with conventional video arcade games. A conventional joy stick only allows a freedom of motion within one plane, for example up and down, right and left. Further, although a simple device such as a joy stick may communicate a desired movement from the user to the computer such devices do not include the capability for a higher level of communication of the user's intentions to the computer. For example, a joy stick may enable a user to move between several rooms in a virtual reality building but provides no means for communicating intentions to the computer such as opening a window or moving a chair within a room by picking it up and placing it in a different virtual location.

More complicated devices such as bodysuits or gloves that a user can adorn are commercially available. However, such suits or gloves have limitations and drawbacks which are undesirable. First, some gloves or suits require relatively expensive optical sensing technology in order to enable a computer to sense a movement of a person's body or hand in order to communicate the user's intentions to the computer. Second, such complex devices require that a user be in a specific environment, for example, a specific room having photosensor capability mounted within it in order to have the computer recognize what the intended motion of the user is at any given time. Further, such devices include the drawback or limitation of not enabling a user to easily communicate intentions to the computer beyond those of physical movement within the virtual reality realm.

Therefore, it is desirable to provide a computer interaction tool that enables a user to effectively move within a virtual reality world and to easily communicate intentions or commands to the computer beyond mere physical movement within a virtual reality environment. It is desirable to provide a virtual reality interface tool that enables the computer based virtual reality system to react to the user's wishes or intentions as quickly and effectively as possible to therefore provide an appropriate new set of visual information or a changed virtual environment to the user.

It is also desirable to provide a human-to-computer interface tool that enables a user to effectively and efficiently perform the various tasks that would be desirable within a virtual reality environment. Such tasks could be classified into four basic categories: (1) navigation, (2) selection, (3) interaction, and (4) command. It is desirable to provide an interface tool that enables a user to simply perform tasks in all four categories simultaneously or independently of each other, depending upon the user's desire.

This invention addresses the need for effective human-to-computer interaction by providing a control device that is operable with the human hand and is capable of enabling a user to perform tasks within the four basic categories mentioned above simultaneously or independently. This invention provides significant improvements over currently available interface tools because it enables a user to navigate within a virtual reality world in six degrees of freedom. Further, this invention provides an interaction tool that enables a user to select from various options presented within a virtual reality world, interact with items or entities that are presented within a virtual reality world and to command the computer to alter the virtual environment according to the user's desires. A significant improvement is presented by this invention because it enables a user to have selective and differential control over the various tasks to be performed within the virtual reality environment.

SUMMARY OF THE INVENTION

In general terms, this invention provides a computer interaction device that includes a base and a handle that is gimbal mounted on the base such that the handle is manipulatable within a three-dimensional coordinate reference frame associated with the handle. In a presently preferred embodiment, a computer interaction device is useful for navigating within a virtual reality environment. The presently preferred embodiment includes a first gimbal yoke that is rotatably mounted on the base such that the gimbal yoke rotates relative to the base. A second gimbal yoke is preferably rotatably mounted on the first gimbal yoke such the second gimbal yoke rotates relative to the first gimbal yoke. A third gimbal yoke is preferably rotatably connected to the second gimbal yoke such that the third gimbal yoke rotates relative to the second gimbal yoke. The handle is preferably fixedly attached to the third gimbal yoke.

The presently preferred embodiment further includes a plurality of input members disposed on the handle to enable a user to communicate a variety of command functions to a host computer. The handle and base are preferably equipped with individual microprocessors for processing electrical signals corresponding to the command functions and for communicating those signals to a host computer.

These and other features and objects of this invention will become apparent to those skilled in the art from the following detailed description of the preferred embodiments together with the accompanying drawings, the following being a brief description of the latter.

BRIEF DESCRIPTION OF THE DRAWINGS

FIG. 1 is a frontal perspective view of a computer interaction device designed in accordance with the teachings of this invention.

FIG. 2 is a rear perspective view of the device illustrated in FIG. 1.

FIG. 9 is a diagrammatic illustration of a set of command signals used in association with this invention.

FIG. 10 is a diagrammatic illustration of a set of command signals which could be used in association with this invention.

FIG. 11 is a diagrammatic illustration of a set of combination binagrams used in association with this invention with accompanying timing diagrams diagrammatically illustrating electrical signals associated with the combination binagrams illustrated in FIG. 11.

DETAILED DESCRIPTION OF THE PREFERRED EMBODIMENTS

Figure 3:
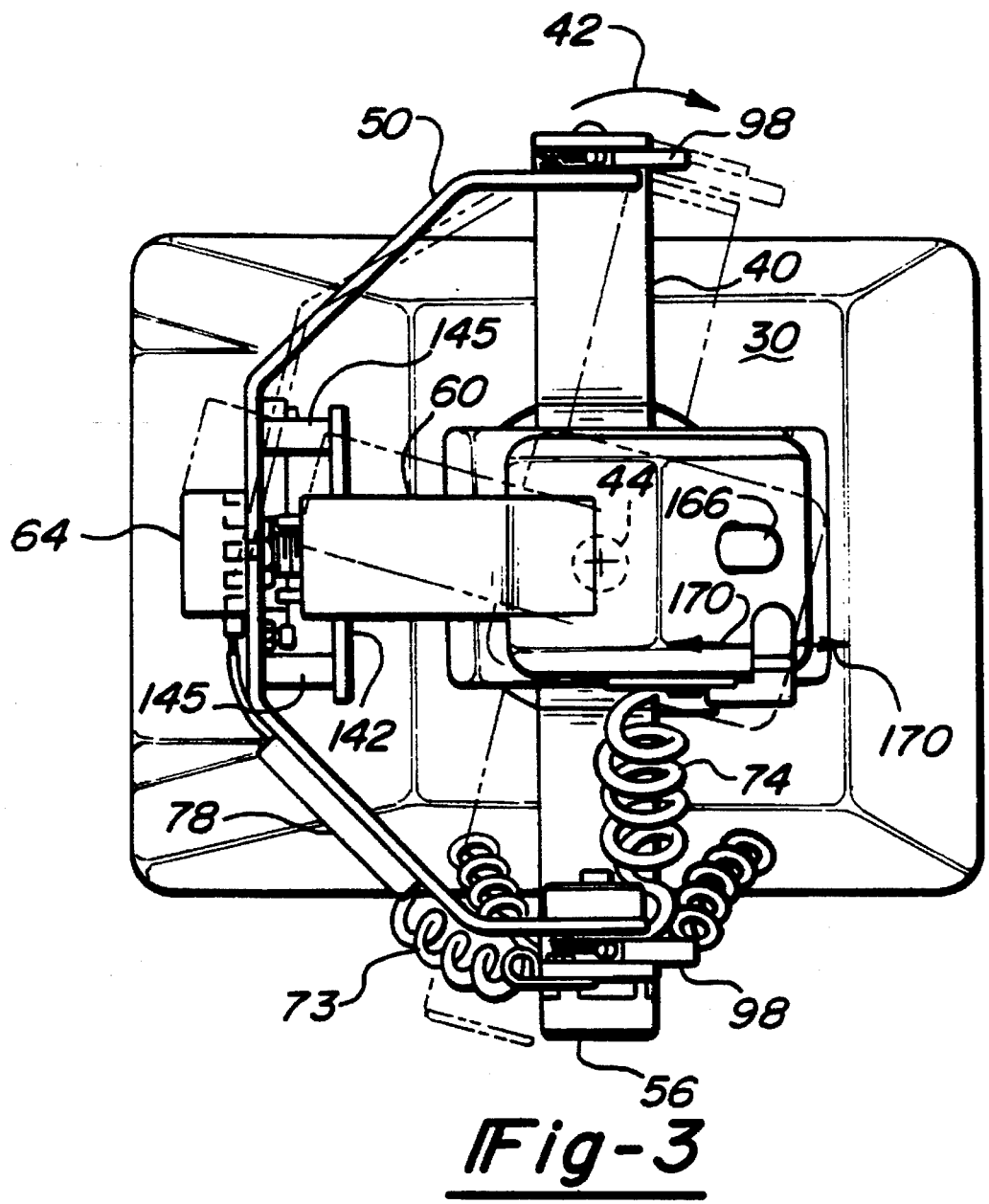
FIG. 3 is a top plan view of the device of FIGS. 1 and 2.

FIG. 1 is a front perspective view of computer interaction device 20. Interface tool or interaction device 20 includes base 22, handle 24 and mounting system 25. For purposes of illustration and enablement, computer interaction device 20 will be described as communicating motion or navigation within a virtual reality world within a coordinate reference frame. The coordinate reference frame associated with this invention is preferably centered, having its origin, at the central point of handle 24. Accordingly, coordinate reference frame 26 is illustrated (in phantom in FIG. 2) having an origin at the center of handle 24. Coordinate reference frame 26 includes roll axis 27, pitch axis 28 and yaw axis 29. Manipulation of interaction device 20 to cause a corresponding movement within the virtual reality world will be described herein generally according to motion within the coordinate reference frame 26. It is to be understood that a different origin or a different coordinate reference frame system could be used in association with this invention, however, it is presently preferred to have a conventional 3-axis orthogonal coordinate reference frame system based at the central point of handle 24 as illustrated.

Base 22 includes base housing 30 which has one or more computer communication ports 32 and supplemental ports 33 for interconnecting the interaction device 20 with computer hardware or a modem for communicating with a computer for example. Base housing 30 houses a microprocessor (not specifically shown) which facilitates communication between the user and the virtual reality realm. For purposes of illustration, this specification shall refer to the virtual reality world, virtual reality realm or host computer interchangeably in order to indicate the receptor of signals or information produced through manipulation of interaction device 20.

Opening 36 is provided in the top (according to the drawing) of base housing 30 in order to enable proper attachment of movable portions of computer interaction 20 as will be described below. Raised portion 38 is provided adjacent opening 30 in order to facilitate such connection and to provide protection for internal portions of device 20 housed within base housing 30.

Referring now to FIGS. 1 through 3, further details of computer interaction device 20 will be described. Handle 24 is preferably gimbal mounted relative to base 22 in order to provide 6 degrees of freedom of navigation movement relative to coordinate reference frame 26. Handle 24 is preferably mounted to enable a user to navigate in directions along all three axes of reference frame 26.

Yaw gimbal yoke 40 is rotatably mounted to base 22. The axis of rotation of yaw gimbal 40 is preferably coincident with yaw axis 29. Yaw gimbal yoke 40 rotates relative to base 22 according to direction arrow 42 (shown in FIG. 3). Yaw gimbal yoke 40 is mounted upon a plate or other mounting means at 44 to provide the illustrated position relative to base housing 30 and opening 36 such that yaw gimbal yoke 40 swivels relative to base housing 30. A central portion 46 of the yaw gimbal yoke is disposed within the space between raised portion 38 and base housing 30. Yaw gimbal yoke 40 has angled projections connected and adjacent to central portion 46 which angle upward (according to the drawing) away from base housing 30 and terminate in yoke ends 48.

Pitch gimbal yoke 50 is hingedly connected to yaw gimbal yoke 40. Ends 52 of pitch gimbal yoke 50 are hingedly connected near ends 48 of gimbal yoke 40. Pitch gimbal yoke 50 rotates relative to yaw gimbal yoke 40 according to direction arrow 54 (shown in FIG. 2). The axis of rotation of pitch gimbal yoke 50 is preferably coincident with pitch axis 28. Pitch potentiometer 56 is mounted upon one end 48 of gimbal yoke 40. Pitch potentiometer 56 indicates rotational movement of pitch gimbal yoke 50 relative to yaw gimbal yoke 40, in a conventional manner. Pitch potentiometer 56 is preferably mounted adjacent ends 48 of yaw gimbal 40 having the center of the potentiometer being coaxial with the axis of rotation of pitch gimbal 50 relative to yaw gimbal 40. Potentiometer 56 preferably communicates to the host computer the direction of rotation or navigation in the pitch direction of coordinate reference frame 26 and a desired speed in that direction. Speed can be indicated, for example, by the degree of rotation of pitch gimbal 50 relative to yaw gimbal 40. For example, by rotating pitch gimbal 50 in the direction of arrow 54 approximately two degrees indicates a desire to move slowly in a "negative" pitch direction. Similarly, rotating pitch gimbal 50 relative to yaw gimbal 40 in an upward direction approximately 30 degrees, for example, indicates to the host computer a desire to move in a "negative" pitch direction at a relatively high speed. Therefore, it can be seen that pitch potentiometer 56 communicates to host computer the desired direction of travel and a desired speed in that direction. Pitch potentiometer 56 works as a conventional potentiometer having such capabilities.

Roll gimbal yoke 60 is hingedly connected to central portion 58 of pitch yoke 50 such that roll gimbal yoke 60 rotates relative to pitch gimbal 50 according to direction arrow 62. The axis of rotation of roll gimbal 60 is preferably coincident with roll axis 27. Roll potentiometer 64 is mounted upon pitch gimbal 50 at the central portion 58 of pitch gimbal 50 to be congruent with the axis of rotation of roll gimbal 60. Roll potentiometer 64 indicates the degree, direction, and amount of rotation of roll gimbal 60 relative to pitch gimbal 50 through an electrical signal which is interpreted by the host computer in a conventional manner. Ends 66 of roll gimbal 60 are fixedly connected to a top and bottom portion of handle 24. Central portion 68 of roll gimbal 60 is rotatably connected to central portion 58 of pitch gimbal 50 in a spring mounted manner that will be further described below.

The three gimbal yokes associated with this invention are preferably formed of a lightweight, rigid metal. Plastics having sufficient rigidity can also be used.

Wire interconnect 70 is provided for communication of electrical signals from roll potentiometer 64 to the conventional microprocessor which is contained within base housing 30. Wire interconnect 72 is provided to communicate electrical signals from pitch potentiometer 56 to the microprocessor within base housing 30. Wiring 73 carries the electrical signals from the pitch and roll potentiometers to the microprocessor within base 24. Wire connect 74 is provided to communicate electrical signals generated within handle 24, as will be further described below such that the microprocessor within base housing 30 is capable of interpreting information from handle 24. The microprocessor within base housing 30 converts signals received from the potentiometers in order to produce a set of digital signals that are received by the host computer. The host computer responsively effects a change within the virtual reality world according to the desires of the user indicated by the electrical signals generated by manipulating handle 24. Openings 76 are provided in base housing 30 for proper coupling of the wire interconnects to the microprocessor within base housing 30.

In a preferred embodiment, a fastening sheath 78 is provided on one face of the pitch gimbal in order to house wiring in a fashion that will not interfere with the desired manipulation of the computer interaction device 20. Clamps 80 or clips are provided as illustrated to facilitate a desirable positioning of the wires required for signal communication between the potentiometers and/or handle and the microprocessor within base 30. The cables or wires used to provide a connection or electrical coupling between the potentiometers and/or the handle and the microprocessor within base 30 are preferably of a flexible and durable character such that movement of the various portions of interaction device 20 will not cause undesirable wear upon these wire interconnections. Further, it is preferable to provide a three wire connection between potentiometer 56 and the microprocessor within the base housing 30 in order to have communication of three basic signals. Specifically, pitch potentiometer 56 is preferably coupled to a five volt voltage supply and a grounded or common terminal. A third wire is preferably provided in order to communicate an analog signal from potentiometer 56 to the microprocessor within base housing 30. The analog signal produced by potentiometer 56 is a conventional analog signal which indicates the degree of rotation of pitch gimbal 50 relative to yaw gimbal 40. Similarly, three wire connections are preferably provided between roll potentiometer 64 and the microprocessor within base housing 30.

Although not specifically illustrated, a potentiometer is mounted within housing 30 and coupled to yaw gimbal 40. Rotation of yaw gimbal 40 relative to base housing 30 actuates a yaw potentiometer in a manner similar to that described above in relation to the roll and pitch potentiometers. A yaw potentiometer used in accordance with this invention is a conventional device that preferably has the capability of indicating the direction and magnitude of rotation of yaw gimbal 40 relative to base housing 30. A yaw potentiometer is coupled to the microprocessor within base housing 30 such that the microprocessor receives an analog signal produced by the yaw potentiometer and converts such a signal to a set of digital signals which are recognizable and received by the host computer in order to communicate the user's intentions or desires to the host computer for providing interaction in the virtual reality world.

Handle 24 and mounting system 25 are preferably mounted upon base 22 such that handle 24 and the mounting gimbals automatically return to a centered or rest position when not being manipulated by a user. The preferred rest position corresponds to orienting coordinate reference frame 26 within real space such that the yaw axis points due north, assuming that base 22 is oriented to be in a horizontal plane that is defined by two axes which are perpendicular to true north. A preferred rest position is illustrated in FIG. 2, for example. The specific orientation of a rest position and the specific location of the origin of a coordinate reference frame associated with the interface device 20 need not be located exactly as described. However, it is important to have a coordinate reference frame that coincides with the six degrees of freedom of movement within interaction tool or device 20. Specifically, it is preferred to maintain a coordinate reference frame that has a yaw axis coincident with the rotation axis of the yaw gimbal yoke, a roll axis that is coincident with the roll gimbal yoke rotation axis and a pitch axis that is coincident with the axis of rotation of the pitch gimbal. Therefore, it is important that manipulation of interface tool 20 coincide with a rotation about one or more axes of coordinate reference frame 26 and any desired linear movements along such axes.

Figure 5:
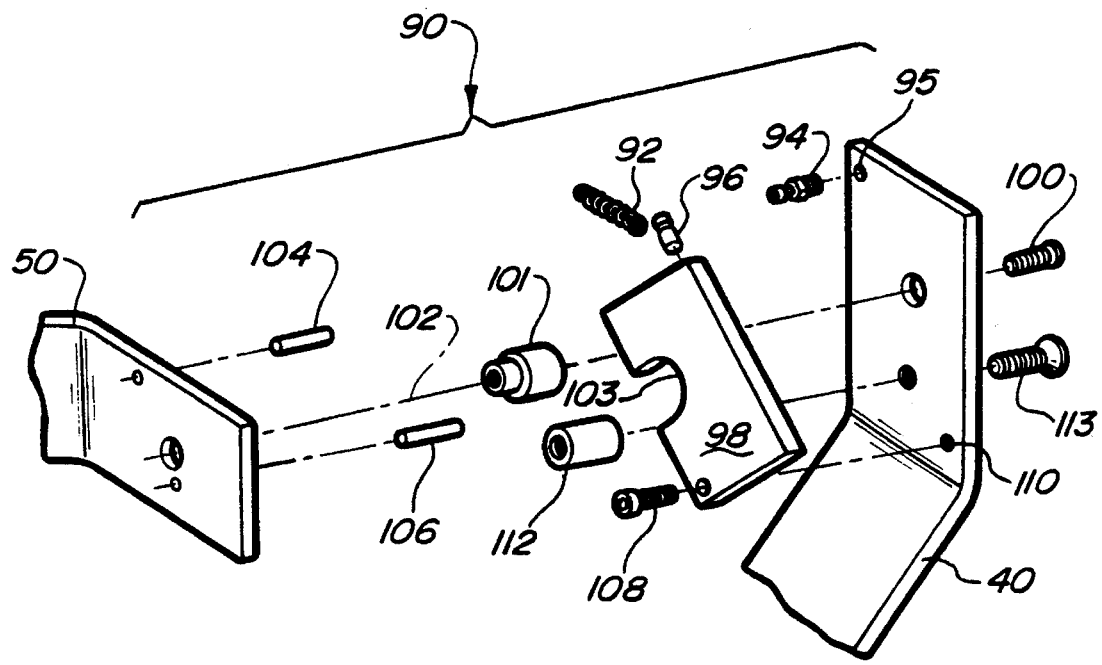
FIG. 5 is an exploded view of a spring loaded mounting apparatus used in connection with this invention.
Figure 6:
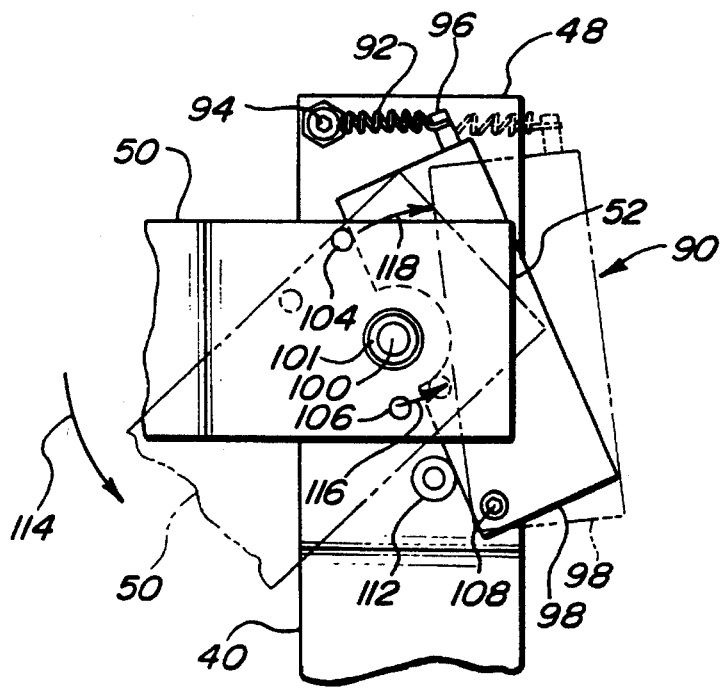
FIG. 6 is a close up plan view of the mounting apparatus illustrated in FIG. 5.

Referring now to FIGS. 5 and 6, the details of the mounting apparatus associated with the mounting system 25 will be described in detail. The connection or mounting apparatus illustrated in FIGS. 5 and 6 is preferably used at the rotatable connection between ends 52 on the pitch gimbal yoke and ends 48 on the yaw gimbal yoke. The specific illustrations in FIGS. 5 and 6 correspond to the right hand side of computer interaction device 20 as illustrated in FIG. 2. It is to be understood that a mirror image of the illustration of FIGS. 5 and 6 would be applied to the left hand side of FIG. 2.

FIG. 6 shows the interaction of the various components of the mounting apparatus 90 while FIG. 5 is an exploded view of those components.

Mounting apparatus 90 includes spring 92 having one end connected to pin 94 which has an attachment point 95 on the yaw gimbal yoke. Pin 96 is fixedly attached to one point on lever 98. A second end of spring 92 is attached to pin 96. This connection allows spring 92 to serve as a biasing means for biasing lever 98 such that pin 96 is biased toward pin 94.

Fastener 100 is provided along with spacer nut 101 to connect the yaw gimbal yoke 40 to the pitch gimbal yoke 50. Pitch gimbal yoke 50 is connected to yaw gimbal yoke 40 such that it rotates about an axis indicated in line 102 in FIG. 5. Pins 104 and 106 are fixedly attached to pitch gimbal yoke 50 and serve as abutment means to bear against lever 98 as will be described below. Fastener nut 108 is provided to hingedly connect lever 98 to yaw gimbal yoke 40 at lever pivot point 110. Stop 112 is affixed to yaw gimbal yoke 40 using a fastener 113. Stop 112 serves as a rest surface for lever 98 and as a means for limiting the rotational movement of pitch gimbal 50 relative to yaw gimbal 40.

When a user manipulates handle 24 such that pitch gimbal yoke 50 rotates in the direction of rotation arrow 114, pin 106 moves in the direction indicated at direction arrow 116. In this manner, pin 106 butts up against a portion of lever 98 causing lever 98 to pivot about pivot point 110. Such pivoting of lever 98 works against the bias of spring 92. When a user reduces the rotation force causing the rotation in the direction of arrow 114 or wishes to release pressure such that the handle returns to an upright position the force of spring 92 biases lever 98 back toward an initial rest position where it butts up against stop 112 and handle 24 is thereby returned to a centered, detent rest position. In this manner, handle 24 is spring biased such that it always returns to a centered rest position when a user does not apply a force in order to manipulate or maneuver the handle relative to base 22. This rest position facilitates orienting the user in the virtual environment after navigating to a new location or orientation.

In a similar manner, if a user rotates the handle such that the pitch gimbal yoke 50 rotates in an upward direction which would be the opposite of the direction arrow 114, pin 104 moves in the direction indicated by arrow 118. As can be appreciated from the drawing, pin 104 butts up against a portion of lever 98 thereby causing lever 98 to pivot about point 110 and against the bias of spring 92. Spring 92 strives to return lever 98 to its rest position. Lever 98 will return to its rest position and thereby cause pitch gimbal yoke 50 to return to a central rest position when a user does not apply any manipulating force to handle 24. The central rest position corresponds to the coordinate reference frame orientation illustrated in FIG. 2.

As illustrated, pins 104 and 106 are preferably connected to pitch gimbal yoke 50 in an off-centered relationship relative to the axis 102. This off-centered relationship provides a more accurate simulation of true linear movement when rotating pitch gimbal yoke 50 relative to yaw gimbal yoke 40 about the pitch axis associated with coordinate reference frame 26.

The mounting apparatus 90 illustrated in FIG. 5 and 6 is one example of an apparatus to be associated with the mounting means that allows for manipulation of the handle along three axes of a three-axis orthogonal coordinate reference frame and for providing a biased mounting such that the handle returns to a rest position when not being manipulated by a user. Other mounting apparatus can be used in association with this invention, but a spring biased apparatus as illustrated is preferred.

Figure 7:
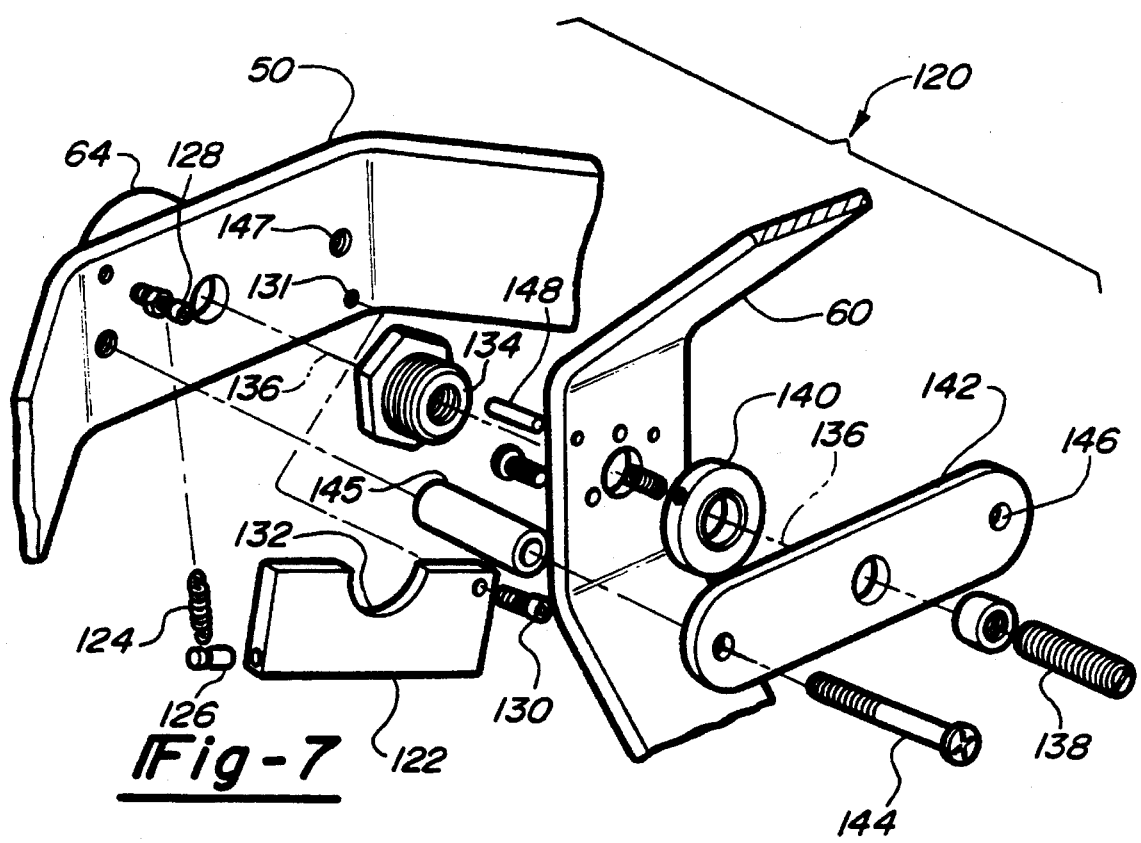
FIG. 7 is an exploded view of another mounting apparatus used in association with this invention.
Figure 8:
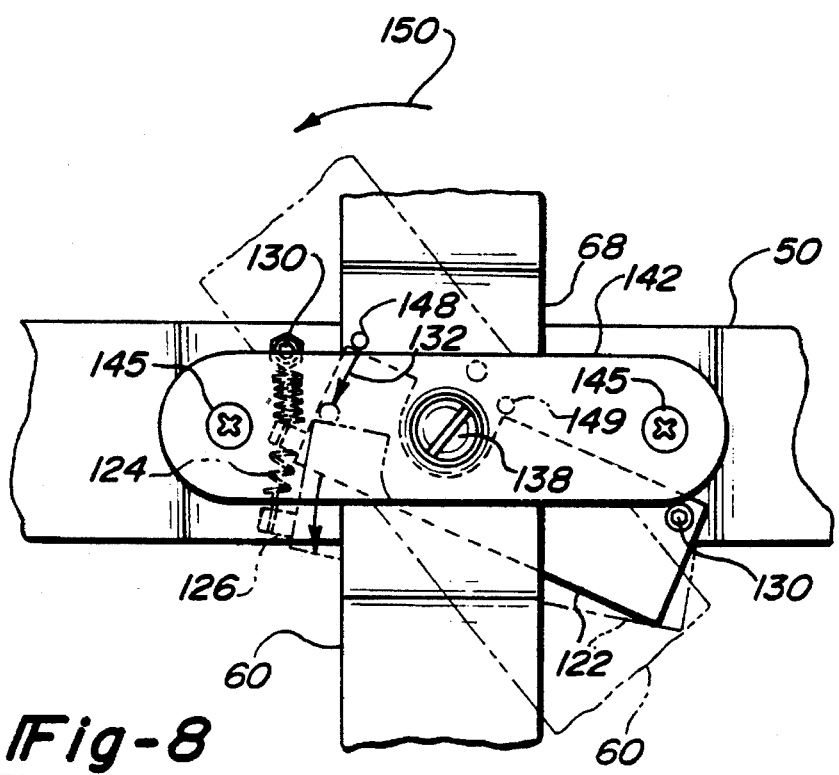
FIG. 8 is a planar view of the mounting apparatus illustrated in FIG. 7, showing the interaction of the various components of that mounting apparatus.

FIGS. 7 and 8 illustrated mounting apparatus 120 which is preferably utilized at the rotatable connection between roll gimbal yoke 60 and pitch gimbal yoke 50. Although not particularly illustrated, mounting apparatus 120 is also preferably used at the rotatable connection between yaw gimbal yoke 40 and a mounting plate or other apparatus within base housing 30 that is capable of rotatably supporting yaw gimbal yoke 40 in the manner described in this specification. Mounting apparatus 120 operates on the same biasing principal as mounting apparatus 90, however mounting apparatus 120 includes more hardware to provide more stability because of the nature of the set up of mounting means 25 illustrated in FIGS. 1 through 8.

Mounting apparatus 120 includes lever 122 which is biased by spring 124. Spring 124 has two ends, a first end connected to pin 126 which is fixedly connected to lever 122 and a second end which is connected to pin 128 which is fixedly connected to yaw gimbal yoke 50. Fastener or pin 130 is provided to hingedly connect lever 122 to yaw gimbal yoke 50 at pivot point 131. Lever 122 rotates about pivot point 131 when acted upon by a rotation of the handle 24 and therefore roll gimbal yoke 60 relative to pitch gimbal yoke 50. In a rest position, groove 132 on lever 122 nestingly receives retainer nut 134 such that retainer nut 134 has an outer peripheral surface that butts up against groove 132. Center line 136 is preferably coincident with the roll axis of the coordinate reference frame 26. Center line 136, as illustrated, properly shows the linear relationship between potentiometer 64, retainer nut 134 and fastener 138 which is used to hold the various components illustrated along center line 136 in a proper relationship. Fastener 138 is preferably a threaded member such as a screw. Spacer nut 140 is provided between stabilizer bar 142 and roll gimbal yoke 60. Spacer nut 140 can be, for example, a housing for a set of ball bearings to facilitate a smoother, relative rotation between roll gimbal yoke 60 and pitch gimbal yoke 50.

Stabilizer bar 142 is connected to pitch gimbal yoke 50 through bolts 144 which are preferably coaxial with arm projections 145. The arm projection 145 that is coaxial with hole 146 and stabilizer bar 142 and hole 147 in pitch gimbal yoke 50 serves as a stop or abutment surface to limit the rotation of roll gimbal yoke 60 relative to pitch gimbal yoke 50. Roll gimbal yoke 60 preferably does not rotate beyond a preselected angle of rotation relative to pitch gimbal yoke 50 such that spring 124 is not stretched beyond its elastic limits. Spring 124 is one example of a biasing means for biasing lever 122 which, in turn, biases roll gimbal yoke 60 into a rest or centered position. Pins 148 and 149 are fixedly attached to roll gimbal yoke 60 and serve as abutment surfaces for bearing against portions of lever 122 in a manner similar to that described above in relation to pins 104 and 106 of FIGS. 5 and 6.

As can be better appreciated in FIG. 8, when roll gimbal yoke 60 is rotated relative to pitch gimbal yoke 50 as indicated by rotation arrow 150, pin 148 bears against a portion of lever 122 causing lever 122 to pivot about pivot point 131. The movement of pin 148 is indicated generally by arrow 152. When a user releases the torque or rotation pressure from the handle and thereby allows spring 124 to bias lever 122 back toward its rest position, roll gimbal yoke 60 and therefore handle 24 are returned to a centered rest position. In a similar manner, when roll gimbal yoke 60 is rotated in a direction opposite to that shown by arrow 150, pin 149 bears against lever 122 causing a pivoting of lever 122 about pivot point 131. Again, lever 122 in combination with spring 124 biases roll gimbal yoke 60 and therefore handle 24 back to a rest position when a maneuvering or rotation force is not being applied by a user.

Although not particularly illustrated, the mounting of yaw gimbal yoke 40 relative to base 24 is preferably designed in accordance with the teachings of FIGS. 7 and 8 and the accompanying description above. It will be understood by one skilled in the art, that the mounting of yaw gimbal yoke 40 will be different from the mounting illustrated in FIGS. 7 and 8 in that pitch gimbal yoke 50 would be substituted with a plate or other sufficient mounting means within base housing 30 to provide a proper support means for mounting yaw gimbal yoke 40. The potentiometer associated with yaw gimbal yoke 40 is preferably located upon the mounting means within the base housing 30 in a location similar to the location illustrated for roll potentiometer 64 in FIG. 7. Again, it is important that the potentiometers associated with each gimbal yoke be centered about the axis of rotation of the gimbal yoke which is preferably coincident with one of the three axes of a coordinate reference frame such as coordinate reference frame 26 (illustrated in FIG. 2).

Referring again to FIGS. 1 through 3, handle 24 includes housing 160 having a top portion 162 and a bottom 164. Handle 24 includes joy stick 166 which is disposed near top portion 162 of handle 24. Joy stick 166 preferably protrudes out an opening defined in housing 160. Joy stick 166 is movable in an up and down and side to side direction (according to the drawing) relative to its position on housing 160. Movement of joy stick 166 in a single direction will actuate one of a plurality of normally open switches 167 (shown in phantom) disposed within housing 160. Actuation of normally open switches 167 causes the production of a digital signal which is communicated to a microprocessor within base housing 30 in order to indicate a desired change in direction of navigation. For example, moving joy stick 166 in an upward direction relative to housing 160 will facilitate communicating to the host computer that the user desires to move upward in a yaw direction according to coordinate reference frame 26. Switches 167 are one means of indicating a desire to move in an upward or downward direction though manipulation of joy stick 166. Other means could be used. For example, a conventional potentiometer could be coupled with joy stick 166 such that movement of joy stick 166 actuates the potentiometer in order to indicate direction and speed of a desired movement within the coordinate reference frame.

Lever 168 is mounted upon housing 160 near the top portion 162 such that a distal end 169 on lever 168 is accessible by the user's thumb when grasping housing 160 of handle 24. Lever 168 is movable in a relatively arcuate upward and downward direction relative to housing 160 as shown by arrows 170. Lever 168 provides a means for communicating a user's desire to move forward or backward in a roll direction according to coordinate reference frame 26. Lever 168 is rotatably mounted upon housing 160 in order to achieve the desired motions just described. A potentiometer is mounted upon the axis of rotation of lever 168 within housing 160. The potentiometer that is actuated by manipulation of lever 168 produces an analog signal in a conventional manner that indicates the direction of desired motion and the magnitude or speed to travel in such a direction. The potentiometer mounted within housing 160 is a conventional device.

Keypad 172 is provided on handle 24 to enable a user to communicate command signals to the host computer, for example. The function of these keys and their use will be described in further detail below. Wire interconnect 74 is provided between handle 24 and the microprocessor within base housing 30 to provide communication between a separate microprocessor which is housed within handle housing 160 and the microprocessor in base housing 30. The microprocessor within handle 24 processes signals produced by manipulation of joy stick 166 and/or keypad 172. The microprocessor housed within handle housing 160 also preferably has a debounce feature to provide for proper communication between the user and the host computer through the use of keypad 172. Wire interconnect 74 preferably has eight wires to carry eight separate signals. Four of the wires are dedicated to signals associate with one of each of the four illustrated keypads in keypad 172, one is dedicated to a signal received from the actuation of lever 168, one is dedicated to a signal associated with actuation of Joy stick 166, one is used for a five volt supply voltage and the final is preferably used for a ground or a common terminal connection. In one embodiment, the potentiometer associated with lever 168 communicates an analog signal directly to the microprocessor housed within base housing 30.

The microprocessor within base housing 30 converts the various analog signals associated with the various potentiometers described above into digital signals. Further, the microprocessor within base housing 30 receives the digital signals produced as a result of manipulation of joy stick 166, for example and keypad 172. These digital signals are received and/or processed within the microprocessor within base housing 30 in a conventional manner and communicated to the host computer. The host computer is preferably coupled to interface device 20 across a serial bit stream that is adapted to conduct at least six bytes of information.

Figure 4:
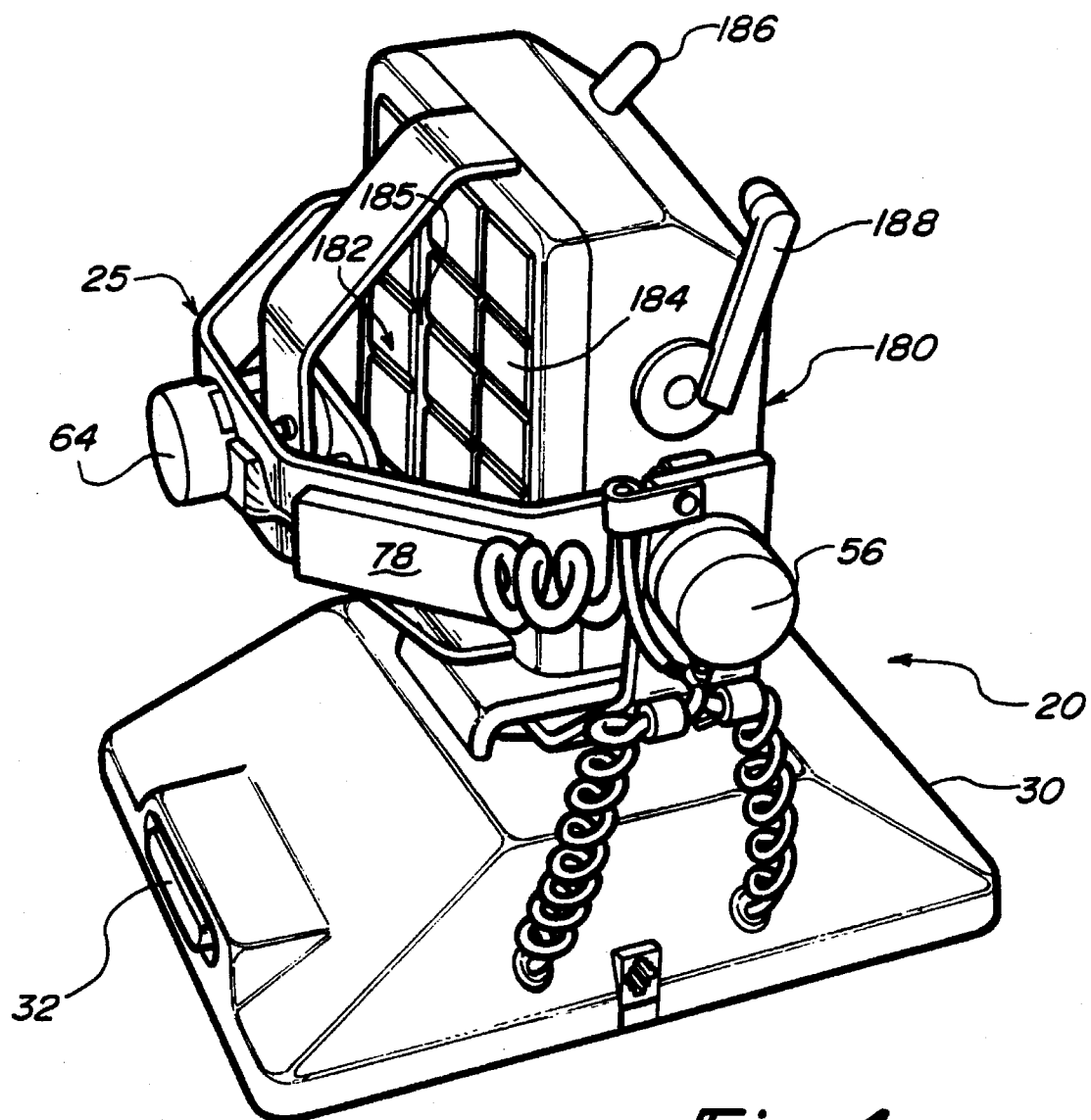
FIG. 4 is a front perspective view of a presently preferred embodiment of a device designed in accordance with this invention.

FIG. 4 illustrates a most preferred embodiment of interface device 20. The embodiment illustrated in FIG. 4 parallels that illustrated in FIGS. 1 through 3. The significant difference between the preferred embodiment of FIG. 4 compared to the embodiment of FIGS. 1 through 3 lies in the illustrated handle 180. Handle 180 includes a more complex keypad matrix relative to the single row (1×4 matrix) illustrated in the embodiments of FIG. 1 through 3. Preferred handle 180 includes keypad matrix 182 and keypad matrix 184 which are separated by the space 185 on handle housing 181. Handle 180 is grasped by two hands rather than the single hand illustrated in FIG. 1. Keypad matrix 182 is preferably manipulated by the fingers of the user's right hand and keypad matrix 184 is manipulated by the fingertips of the user's left hand. The combination of keypad matrix 182 and keypad matrix 184 provide a significant advantage in communicating command signals from a user to a host computer compared to prior devices. The function and capability of the combination of matrix 182 and matrix 184 will be described in further detail below.

Handle 180 includes joy stick 186 and lever 188. Joy stick 186 and lever 188 function in a manner similar to joy stick 166 and lever 168 described above. In this most preferred embodiment, it is preferable that joy stick 186 be coupled to a potentiometer such that movement in the roll and/or pitch directions (according to coordinate reference frame 26) is controllable in magnitude and direction. It is further preferable that joystick 186 be mounted on handle 180 such that it is manipulated by a user's right thumb. Similarly, lever 188 is preferably manipulated by a user's left thumb. Otherwise, the preferred embodiment illustrated in FIG. 4 functions in accordance with the description of the embodiment illustrated in FIGS. 1 through 3 and described previously.

The embodiments illustrated in FIGS. 1 through 8 enable a user to accurately control navigation within the virtual reality world on a differential basis. Differential basis, as used herein, defines navigational control that is instigated simultaneously along a roll, pitch and yaw axes or on each axis individually. The ability to navigate on such a differential basis is an important enhancement that this invention provides over previous devices. Further, differential control of navigation improves the ability to navigate within a virtual reality world in a manner more like natural movement within the real world. Differential control allows the host computer or virtual reality system to react to the user's intentions more quickly and effectively.

Referring now to FIGS. 9 through 11, the operation of keypads 172, 182 and 184 will be described. The keypad used in association with this invention is preferably designed according to the teachings of U.S. Pat. No. 4,831,218, issued to Applicant on May 16, 1989 and having common assignee with this application. U.S. Pat. No. 4,831,218 is hereby incorporated by reference into this specification. The keypad associated with this invention operates on the principals of binary communication. The keypad (whether it be keypad 172, 182 or 184) is used to produce symbolic characters that communicate through binary signals to the host computer. Such symbols are referred to herein as binagrams.

For example, FIG. 9 illustrates a series of binagrams 190 that can be produced using keypad 172 or keypad matrix 182. Each square corresponds to a keypad in the keypad matrix. A darkened square indicates a depressed key, while a white or blank square indicates a key that is not pressed. A keypad matrix such as 172 or 182 (having a 1×4 array) provides the ability to produce 10 different binagrams. Each of these are illustrated in the series 190. As a specific example, binagram 192 corresponds to having the top key in keypad 172 depressed while leaving the others untouched. This binagram would correspond, for example, to a command to the host computer that will communicate the user's intention to select an option within the virtual reality world having a numerical value of one. As can be seen in FIG. 10, a 1×4 matrix of keypads such as that illustrated by keypad matrix 172 or 182 provides a useful means for generating information corresponding to the conventional base ten numeral system.

More specifically, within a virtual reality world binagrams can be used to communicate a user's intentions to the host computer. For example, if a user is traveling through a virtual room which has a window, a binagram such as binagram 194 could be generated by the computer as a visual symbol upon that window. The user enters binagram 194 by using keypad 172, for example, in order to communicate a desire to the host computer that the user wishes to open that window. As a further example, binagram 194 could appear upon the window and when the user enters binagram 194 using keypad 172 that would access a menu which presents a series of binagrams to the user enabling the user to perform one or more of a plurality of functions relative to that window. For example, the menu could provide a series of binagrams each having a specific function associated with them. One binagram could correspond to opening the window, one binagram could correspond to closing the window and a third could correspond to locking the window, for example. Assuming that the user intended to close and lock the window, the user would enter the binagram associated with closing the window followed by the binagram associated with locking the window thereby communicating the user's desire to the computer to effect a change in the virtual reality world (namely to close and lock the window) quickly, easily and effectively.

Referring now to FIG. 10, a series of binagrams 196 associated with a 2×4 matrix are illustrated. A 2×4 matrix corresponds to keypad 184, for example. As can be seen in FIG. 11, a 2×4 keypad matrix provides a useful means for generating alphabetic characters associated with the English alphabet. All 26 characters are easily generated by using a maximum of three keys within keypad 184. The various combinations illustrated in FIG. 11 indicate a depressed key by a darkened square and an untouched key (or nondepressed key) by a white square. The series of binagrams 196 illustrated in FIG. 10 could be used to spell out a user's intentions in words in order to communicate that information to the host computer. Further, as briefly described above, a series of binagrams can be associated with various elements within the virtual reality world and can be input to the host computer by the user depressing the appropriate keys on keypad matrix 184. Therefore, it can be seen that the various combinations associated with keypad matrices 172, 182 and 184 provide a user with the capability of effectively communicating intentions to a host computer provided that the software associated with the generation of and interaction with the virtual reality world is attuned to receiving and interpreting digital signals associated with binagrams such as those illustrated. Such software can be designed using conventional software techniques.

The preferred combination of keypad matrix 182 and keypad matrix 184 on handle 180 as illustrated in FIG. 4, provides a tremendous advantage in communicating a user's intentions to a host computer to effect a change within a virtual reality world. The combination of the single column keypad matrix 182 (effectively a four bit column) and keypad matrix 184 (effectively two four bit columns) provides the user with the ability to enter $2 \times 10^{12}$ total combinations or binagrams.

A combination of one or more keys to form a particular symbol will be referred to herein as a combination binagram. FIG. 11 illustrates four different combination binagrams. FIG. 11 also illustrates one method of communicating combination binagrams to the host computer illustrated in timing diagrams 198, 200 and 202. The left side of FIG. 11 illustrates four different combination binagrams generated by a 3×4 keypad matrix.

The keypad matrix illustrated in FIG. 11 includes left column 204 which comprises a 1×4 array, middle column 206 and right side column 208. Left column 204 corresponds to keypad matrix 182 while middle column 206 and right column 208 correspond to keypad matrix 184 illustrated in FIG. 4, for example. Darkened squares within the keypad matrix illustrated in FIG. 11 correspond to depressed keys while blank or white squares correspond to keys that remain in a raised, rest position. As described in U.S. Pat. No. 4,831,218 depressing a key within the keypad matrix generates an electrical signal along a circuit associated with each keypad. The electrical signal is illustrated in FIG. 11 as a pulse signal along the respective lines associated with the timing diagrams.

Timing lines 210, 212, 214 and 216 are associated with the four keypads in the left side column 204. Similarly, timing lines 218, 220, 222 and 224 are associated with the middle column 206. If follows then, that timing lines 226, 228, 230 and 232 are associated with the keypads in right side column 208.

Suppose that a user desires to enter the first combination binagram 234 in order to communicate a specific desire to a host computer. The user must depress the lowest two keys within middle column 206. Depressing each key instigates a pulse signal along the circuitry associated with each key. Specifically, pulse 236 is generated by depressing the lower most key and pulse 238 is generated by depressing the key directly above. As can be seen in FIG. 11, timing lines 222 and 224 normally have a zero or null value. Generating a pulse by depressing a key instigates a positive signal across the circuitry associated with the keypad thereby effectively creating a one value (as "one" is associated with a binary value).

The computer within handle 24 or 180 reads a binagram based upon a series of pulses entered between null states. A null state refers to a zero value across all the timing lines associated with each key in the illustrated keypad matrices. For example, at a point in time labeled 250 in FIG. 11 a null state exists. Later in time, pulse 236 is instigated along line 222 followed by pulse 238 which is instigated along line 224. It is important to note that pulses 236 and 238 are not completely contiguous in time. Rather an overlapping relationship is provided. At the tail end of pulse 238 a null state is present along all of the illustrated timing lines. Therefore, the computer within handle 24 or 180 interprets the first binagram 234 based upon the contiguous pulse signals generated between null state 250 and null state 252. Null state 252, therefore, is referred to as an event trigger associated with first binagram 234.

As can be appreciated from the drawing, binagram 234 is relatively simple for a user to input to the computer. However, applications may be required wherein a more complicated combination binagram is desirable or necessary. Therefore, it is necessary to provide a user with the ability to enter a more complex binagram while allowing for varying degrees of dexterity among users. Therefore, the computer within the handle associated with this invention is preferably programmed to recognize a combination binagram based upon a series of pulse signals that overlap in time, at least partially, between null states. In this manner, a user can depress a plurality of keys in a series combination and still achieve the desired result.

As a further example, consider the binagram illustrated at 254. All four keys in the right column 208 need be depressed in order to generate the pulse signals associated with this binagram. As illustrated at 256 in FIG. 11, beginning at null state 258 pulse 260 is generated by depressing the top key in the right column of keypad 208. Pulse 262 is initiated by depressing the third key from the top in the right column 208 prior to releasing the first key which was associated with pulse 260. Similarly, pulse 264 is initiated before pulse 262 is terminated and pulse 266 is initiated before pulse 264 is terminated. In this manner, all four keys are depressed and the four required pulse signals are generated but not all four keys need be pressed simultaneously to generate the signals required for the combination binagram 254. In this manner, the keypads associated with this invention provide a user with the ability to enter any combination binagram in a relatively easy manner. It is to be understood that a computer associated with this invention for interpreting signals from the keypad matrices could be programmed differently for example, by requiring simultaneous key depression. However, the preferred method is to have the computer recognize a binagram as a series of pulses that are contiguous in time and separated by null states as described above.

The preceding description is exemplary rather than limiting in nature. Variations and modifications from the illustrated embodiments are possible that do not depart from the purview and scope of this invention. The scope of this invention is to be limited only by the appended claims.

I claim:

1. A device for communicating with a host computer, comprising:

a base;

a handle having a plurality of input members for generating a set of command signals, said command signals comprising combination binagrams;

means for mounting said handle upon said base such that said handle is manipulatable within a three-dimensional coordinate reference frame centered about a preselected origin within said handle, said reference frame having three orthogonal axes, said axes intersecting at said origin, said handle being manipulatable relative to said base;

means for producing a set of orientation signals that define the orientation of said handle relative to said base;

means for communicating said set of command signals and said set of orientation signals to said host computer;

said handle comprising a handle housing adapted to fit within a grasp of a user;

a keypad including a plurality of pushbuttons that have a raised rest position relative to said base housing;

a first lever mounted on the outside of said handle housing adapted to move in two distinct directions relative to said handle housing; and a second lever disposed partially within said handle housing adapted to move in four distinct directions relative to said handle housing.

2. The device of claim 1, wherein said base comprises a base housing, a microprocessor within said base housing and a serial data link port disposed adjacent one end of said base housing.

3. The device of claim 1, wherein said input members comprise said keypad, said first lever and said second lever, respectively.

4. The device of claim 1, wherein said producing means comprises a plurality of potentiometers disposed on said mounting means.

5. A device for claim 1, wherein said communicating means comprises a microprocessor coupled to said host computer.

6. The device of claim 1, wherein said preselected origin is at a central point within said handle.

7. The device of claim 1, wherein said combination binagrams comprise a plurality of electrical pulses that at least partially overlap in time, each said electrical pulse being generated upon displacement of one of said pushbuttons from said raised rest position.

8. The device of claim 1, further comprising means for biasing said handle into a centered rest position.

9. The device of claim 8, wherein said mounting means comprises a gimbal mounted system including three gimbal yokes that independently rotate about gimbal axes associated with each said gimbal yoke, respectively.

10. The device of claim 8, wherein said mounting means comprises:

a first gimbal yoke having a central portion and two end portions rotatably mounted on said base adjacent said central portion on said first gimbal yoke, said first gimbal yoke rotating relative to said base;

a second gimbal yoke having a central portion and two end portions rotatably connected to said first gimbal yoke, said end portions on said second gimbal yoke being adjacent to said end portions on said first gimbal yoke, respectively, said second gimbal yoke rotating relative to said first gimbal yoke; and a third gimbal yoke having a central portion and two end portions rotatably connected to said second gimbal yoke, said central portion of said third gimbal yoke being disposed adjacent said central portion of said second gimbal yoke, said third gimbal yoke rotating relative to said second gimbal yoke.

11. The device of claim 10, wherein each said gimbal yoke has a respective axis of rotation that is coincident with said three orthogonal axes, respectively.

* * * * *